Oct. 5, 1937.  H. J. HARNISCH  2,095,189
SOY BEAN ATTACHMENT
Filed April 12, 1937  2 Sheets-Sheet 1
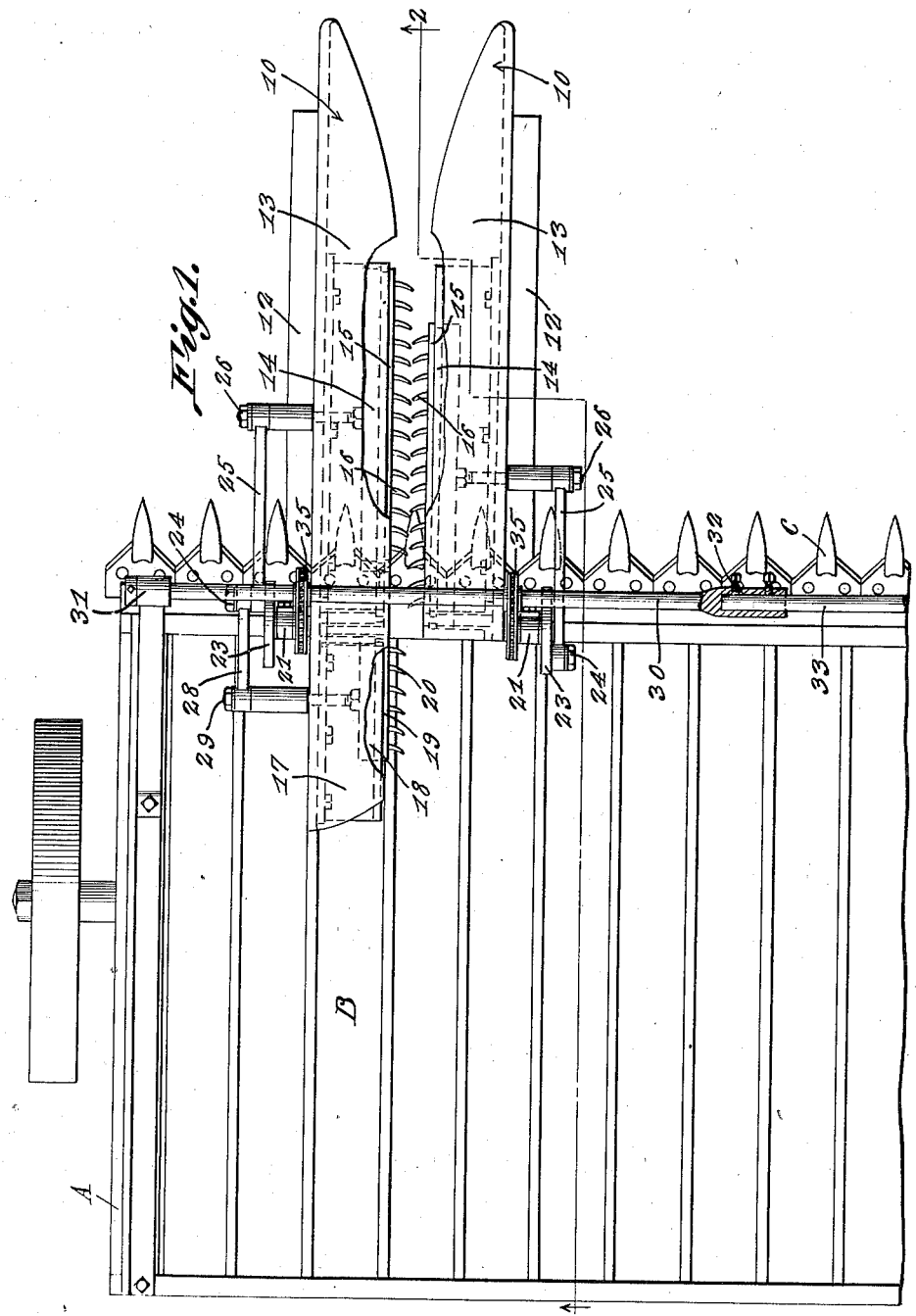
Henry J. Harnisch, INVENTOR
BY Victor J. Evans & Co.
ATTORNEYS Oct. 5, 1937.  H. J. HARNISCH  2,095,189
SOY BEAN ATTACHMENT
Filed April 12, 1937   2 Sheets-Sheet 2
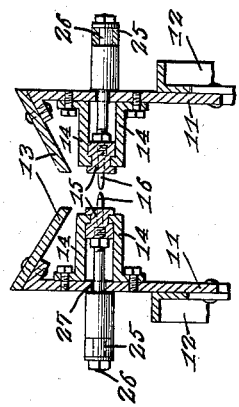
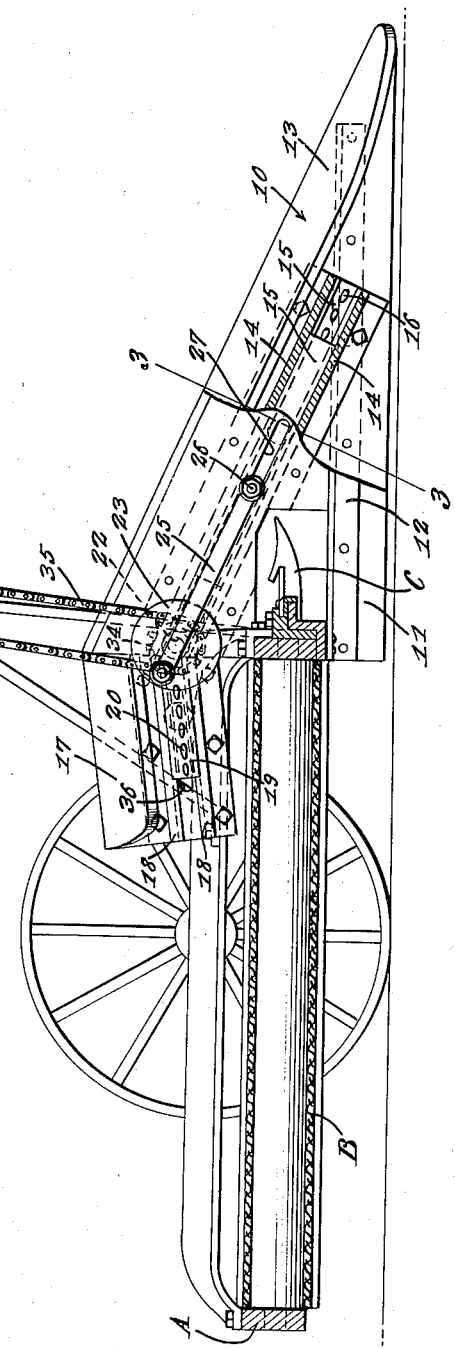
Henry J. Harnisch, INVENTOR
BY Victor J. Evans & Co.
ATTORNEYS Patented Oct. 5, 1937

2,095,189

UNITED STATES PATENT OFFICE 2,095,189

SOY BEAN ATTACHMENT

Henry J. Harnisch, Ionia, Iowa

Application April 12, 1937, Serial No. 136,408

3 Claims. (Cl. 56—312)

The invention relates to an attachment for grain binder machinery and more especially to a soy bean gathering attachment for such machinery.

The primary object of the invention is the provision of an attachment of this character, wherein the same involves the forwardly inclined gathering fingers, these having associated therewith slides carrying tines so that when the binder machinery is advanced through a field the soy beans will be picked up by the gathering fingers and the slides with the tines thereon will feed the bean tops straight with a sickle so that such bean plants standing within a field will be severed by the sickle and delivered onto the binder conveyor or apron for subsequent binding operation by the machinery, thereby enabling the successful gathering of the soy beans while growing and the cutting of the beans on the advancement of the binder machinery.

Another object of the invention is the provision of an attachment of this character, wherein the feeders in association with the gathering fingers for the soy beans are operated in a novel manner.

A further object of the invention is the provision of an attachment of this character, which eliminates a necessity for material alteration in the binder machinery and in the use of such attachment soy beans can be gathered and cut when standing in a field, the gathering and feeding operation being automatic and operative on the advancement of the binder machinery through the field.

A still further object of the invention is the provision of an attachment of this character, which is simple in its construction, readily applied to the apron frame of a binder machine, thoroughly reliable and efficient in operation, automatic in the working thereof, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary top plan view of the apron frame of a binder machine with a sickle and the attachment constructed in accordance with the invention in association.

Figure 2 is a sectional view taken on the line 2—2 of Figure 1 looking in the direction of the arrows.

Figure 3 is a sectional view on the line 3—3 of Figure 2.

Similar reference characters indicate corresponding parts throughout the several views in the drawings.

Referring to the drawings in detail, A designates generally a portion of the frame supporting a traveling apron B of a binder machine of conventional type while C denotes the sickle which is disposed at the fore side of the frame A as is usual. Suitably mounted on this frame A are the spaced forwardly inclined gathering fingers 10 which include perpendicular panels or side walls 11, these being fixed to supports 12 beneath and fixed to the said frame A. Attached to the upper edges of the panels or walls 11 are the downwardly convergent guide boards 13.

On the inner faces of the panels or walls 11 are opposed pairs of spaced upper and lower tracks 14 having interfitted therewith feeders in the form of slides 15 carrying teeth or tines 16 so that growing soy beans when entering between the gathering fingers 10 will be fed rearwardly thereof for the straightening of the same on application to the sickle C which cuts or severs the beans for delivery onto the apron B of the binder machine.

The gathering fingers 10 are superposed at their rear elevated ends with respect to the apron B and the sickle C and one of these fingers joins at its rear end with a rearwardly inclined extension 17 overhanging for a distance the apron B carried by the frame A and this extension has the pair of tracks 18 interfitted with a feeder in the form of a slide 19 having the teeth or tines 20 similarly to the teeth or tines 16 on the slides 15.

Carried at the fore side of the frame A and at opposite sides of the companion gathering fingers 10 next to the rear ends thereof are suitable bearings 21 having journaled therein the stud axles 22 of eccentric disks 23 fixed thereto. Each disk 23 is provided with an eccentric pin or pivot 24 to which is connected a link 25, these links being pivoted by pins 26 to the feeders constituted by the slides 15. The eccentric pins 24 are oppositely set with relation to each other on the disks 23 so that on movement of one slide 15 the other slide travels reversely thereto and in this manner the soy beans will be positively fed rearwardly between the gathering fingers 10 for severance by the sickle C on the advancement of the binder machine. The pivot pins 26 connected to the slides 15 work in guide slots 27 formed in the panels or walls 11 of said gathering arms. The eccentric pin 24 next to the extension 17 has connected therewith a link 28 which through the pivot pin 29 is connected with the slide 18 so that the latter is reciprocated in the extension and thus carrying the severed beans onto the apron B of the binder machine while the said machine is advanced over a field.

A driving shaft 30 suitably journaled at 31 through a separable coupling 32 has connection with a power shaft of the binder machine, a portion of this shaft being indicated at 33. The shaft 30 has sprocket and chain connections 34 and 35, respectively, with the stud axles 22 of the eccentric disk 23 and in this manner the feeders or slides 15 and 19 are operated. The pivot 29 connected with the slide 19 operates in a slot 36 provided in the extension 17. The beans are gathered between the gathering fingers 10 whence such beans are acted upon by the slides 15 feeding the same to the sickle C and thence the slide 19 delivers the severed beans onto the apron B of the binder machine when the latter is advanced over a field.

What is claimed is:

1. In an attachment of the kind described, the combination of gathering fingers associated with a sickle and apron of a binder machine, tracks built on said fingers and extending in reverse directions to each other, one of said tracks being projected and inclined forwardly of the machine, all of said tracks being laterally spaced from each other and in parallel relation to one another, slides operating upon said tracks and having teeth, and driven eccentrics having linkage with said slides and operating the same reversely to each other.

2. In an attachment of the kind described, the combination of gathering fingers associated with a sickle and apron of a binder machine, tracks built on said fingers and extending in reverse directions to each other, one of said tracks being projected and inclined forwardly of the machine, all of said tracks being laterally spaced from each other and in parallel relation to one another, slides operating upon said tracks and having teeth, driven eccentrics having linkage with said slides and operating the same reversely to each other, an overhanging extension with relation to the apron at the rear end of one of said fingers, tracks on said extension, a slide operating upon the track and having teeth, and a connection between one of said eccentrics and the last-mentioned slide for operating the same.

3. In an attachment of the kind described, the combination of gathering fingers associated with a sickle and apron of a binder machine, tracks built on said fingers and extending in reverse directions to each other, one of said tracks being projected and inclined forwardly of the machine, all of said tracks being laterally spaced from each other and in parallel relation to one another, slides operating upon said tracks and having teeth, driven eccentrics having linkage with said slides and operating the same reversely to each other, an overhanging extension with relation to the apron at the rear end of one of said fingers, tracks on said extension, a slide operating upon the track and having teeth, and a connection between one of said eccentrics and the last-mentioned slide for operating the same, the said gathering fingers being disposed above and inclined forwardly with relation to the sickle.

HENRY J. HARNISCH.